United States Patent [19]

Wallach et al.

[11] 3,909,798

[45] Sept. 30, 1975

[54] VIRTUAL ADDRESSING METHOD AND APPARATUS

[75] Inventors: Steven J. Wallach, Chelmsford; Alan J. Deerfield, Newtonville; Stanley M. Nissen, Reading, all of Mass.

[73] Assignee: Raytheon Company, Lexington, Mass.

[22] Filed: Jan. 25, 1974

[21] Appl. No.: 436,410

[52] U.S. Cl. .......... 340/172.5

[51] Int. Cl.$^2$ .......... G06F 9/20

[58] Field of Search .......... 340/172.5; 444/1

[56] References Cited

UNITED STATES PATENTS

| | | | |
|---|---|---|---|
| 3,611,307 | 10/1971 | Podvin et al. | 340/172.5 |
| 3,614,746 | 10/1971 | Klinkhamer | 340/172.5 |
| 3,693,165 | 9/1972 | Reiley et al. | 340/172.5 |
| 3,720,920 | 3/1973 | Watson et al. | 340/172.5 |
| 3,723,976 | 3/1973 | Alvarez et al. | 340/172.5 |
| 3,761,881 | 9/1973 | Anderson et al. | 340/172.5 |

*Primary Examiner*—Mark E. Nusbaum
*Attorney, Agent, or Firm*—Philip J. McFarland; Joseph D. Pannone; Richard M. Sharkansky

[57] ABSTRACT

Method and apparatus are disclosed to implement an improved virtual addressing technique whereby access, whenever permissible, to a bulk memory may be effected, on demand, by any one of a plurality of processors in a digital computer system, each such processor being capable of providing either a page location code or an entry location code as an address for the bulk memory. In addition, method and apparatus are disclosed to determine whether or not instructions required to execute any required step in a program are available at the processor and, if not, to fetch such instructions from bulk memory. Still further, method and apparatus are disclosed either to store all entries on any fetched pages in a memory at each demanding processor, the address of each fetched page in such memory being determined in any one of a number of ways, or to apply fetched entries directly to an arithmetic unit in the demanding processor.

3 Claims, 13 Drawing Figures

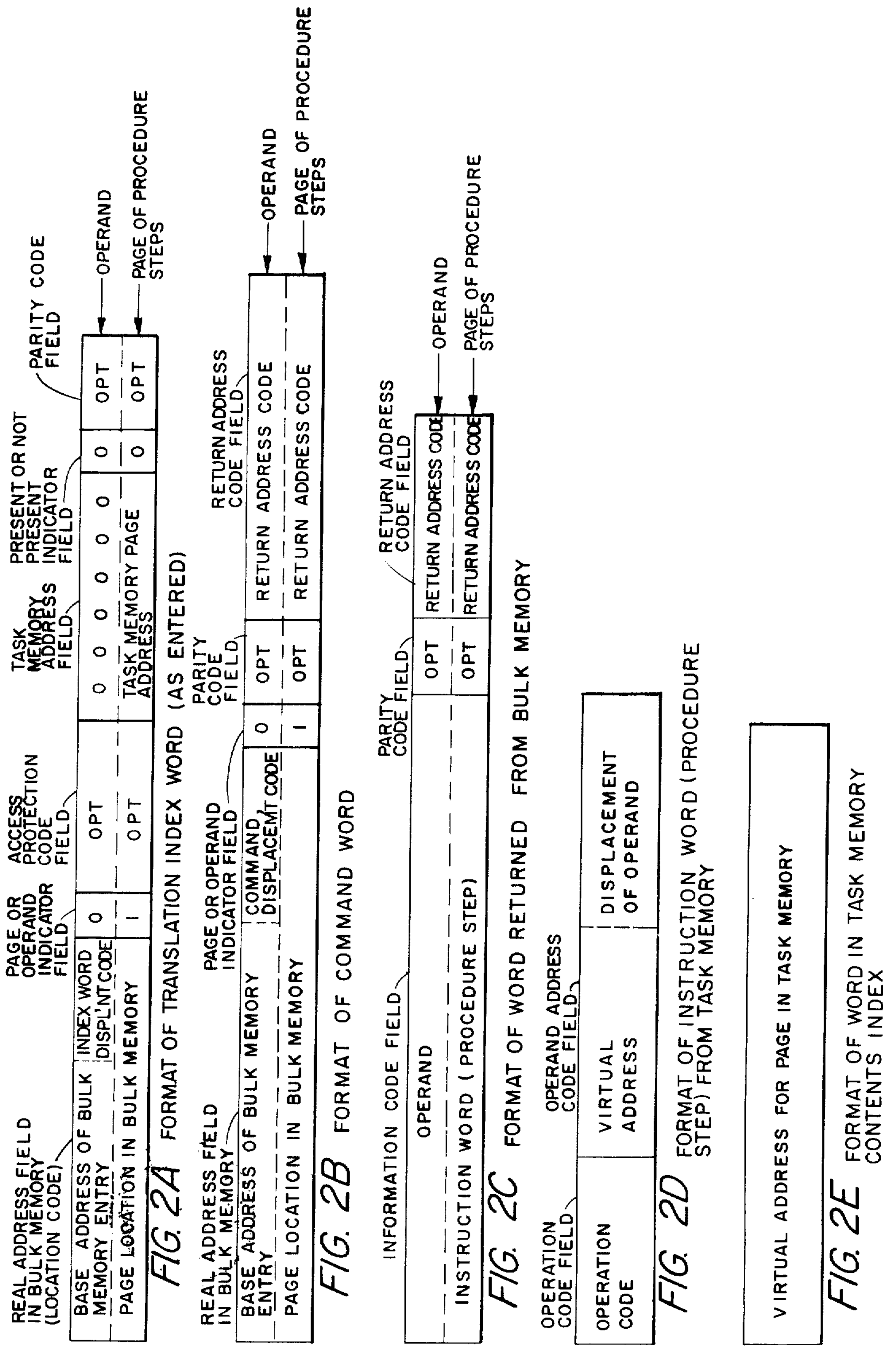
FIG. 2A FORMAT OF TRANSLATION INDEX WORD (AS ENTERED), FIG. 2B FORMAT OF COMMAND WORD, FIG. 2C FORMAT OF WORD RETURNED FROM BULK MEMORY, FIG. 2D FORMAT OF INSTRUCTION WORD (PROCEDURE STEP) FROM TASK MEMORY, FIG. 2E FORMAT OF WORD IN TASK MEMORY CONTENTS INDEX

VIRTUAL ADDRESSING METHOD AND APPARATUS

The invention herein described was made in the course of or under a contract or subcontract thereunder, with the Department of Defense.

BACKGROUND OF THE INVENTION

This invention relates generally to digital computer systems and particularly to such types of systems utilizing virtual addressing techniques.

It is known in the art that addresses in memory of a digital computer system may be virtually addressed. When such an approach is taken, each storage device (such as a magnetic drum, a magnetic tape or a magnetic core matrix or any other type of bulk store) making up a bulk memory of such a system may be considered to be divided into parts usually referred to as segments. Each segment is considered to be divided into contiguous and equal modules, usually referred to as pages, containing the same number of addresses. The position of each different address on each page is referred to as the displacement of the address, or simply the displacement. With locations in bulk memory designated by segment, page and displacement access may be had to any single desired entry in bulk memory from any one of a plurality of processors in a digital computer system. Alternatively, locations in bulk memory may be by segment and page to permit access to all entires on a given page in bulk memory by any one of a plurality of processors in a digital computer system. In known systems, however, only pages in bulk memory may be addressed, making it often neceessary to fetch many irrelevant and unused entries from bulk memory during execution of programs.

In order that the benefits of virtual addressing may be attained in any given digital computer system, the capacity of the local memory of each processor should be less than the capacity of the auxiliary memory. That is, there should be fewer pages in local memory than in bulk memory. In known digital computer systems, it is conventional to fetch only pages of information from bulk memory. That is, all entries on a given page are fetched from bulk memory, even though only a single entry on such page is desired. Obviously, if complete pages of entries such as operands must be transferred from bulk memory to local memory during execution of any program (even though ordinarily only a single operand on the transferred page may be required), program execution time must, perforce, be lengthened by the time to fetch many unwanted operands and the capacity of local memory must be increased. It is highly desirable, therefore, that any page fetched from bulk memory have as many usable entries as possible.

With any known digital computer system using virtual addressing, provision should be made to replace pages in local memory in the most efficient manner, ideally so as to reduce the number of page fetches from bulk memory to a minimum. Unfortunately, the optimum replacement rule, or replacement algorithm, may change during execution of any given program. In known virtual addressing systems, however, a single replacement rule must be adopted before execution. Therefore, becuase it is not possible to change the replacement rule during execution, the number of fetches of pages from bulk memory may be greater than necessary, causing program execution time to be increased.

When more than one processor is to be permitted to share access to a single bulk memory, it is almost mandatory that measures be taken to protect the integrity of data in such memory. That is, locations in bulk memory containing data must be made accessible (for either reading or writing) to any processor only under predetermined conditions. For example, if two processors in a digital computer system are executing the same program (say both processors are performing Fast Fourier Transforms on return signals from two different radars) both processors could have access to the pages in a shared bulk memory containing instructions sometimes referred to hereinafter as procedure steps) but each processor would have to be inhibited from access, either to read or to write, to locations in bulk memory containing operands, i.e., data representing radar return signals, used by the other in executing its program. On the other hand, as when processors are executing a program in parallel, it is necessary that intercommunication (including a mutual capability of access to locations in bulk memory containing data) be possible between them.

DEFINITION OF TERMS

Before proceeding further, the following definitions of terms applicable to the description of our invention should be borne in mind:

a. TASK MEMORY - a portion of local memory, organized by pages at each processor in a computer system, for storing instructions fetched from bulk memory as contigous procedure steps (or constants) during execution of a program. The contents of the task memory differ from the contents of the usual main memory in that data fetched from bulk memory is never stored in the task memory.

b. TRANSLATION INDEX TABLE - a portion of local memory consisting of a page, or an integral number of pages, containing, at contiguous virtual addresses, a set of logical statements (or translation index words) describing the manner in which virtual addresses are to be translated into real addresses in bulk memory or task memory during execution of a program. Each logical statement, at a minimum, contains:
  i. a location code indicative of the real address of a required page in bulk memory or indicative of a portion of the real address of a required operand in bulk memory;
  ii. a page or operand indicator to show whether or not all entries on a page in bulk memory are required; and
  iii. a present or not present indicator to show whether or not the address of a page of procedure steps in task memory is included in the logical statement. Each logical statement additionally contains a field for a task memory address to indicate the page location in task memory at which a page fetched from bulk memory is resident or to indicate the page location in task memory to which a page is to be transferred from bulk memory. Still further, each logical statement contains an access protection code and a parity code to control communication between the processor and bulk memory.

c. TASK MEMORY CONTENTS INDEX - a portion of local memory addressed by task memory page addresses containing the addresses of all those translation index words which include the task memory page address of pages resident in task memory at any time during execution of a program.

d. BULK MEMORY - memory devices, ordinarily accessible to more than one processor in a digital computer system, for storing equal blocks of information (meaning pages of procedure steps) and for storing operands at individually designated locations. In our contemplated system, bulk memory preferably includes at least a first type of memory device (as at least one random access core memory) having a relatively short access time for storing operands at designated locations and a second type of memory device (as at least one magnetic drum) having a relatively long access time for storing blocks, or pages, of instructions, or procedure steps. The first memory device then may be considered to be a part of a conventional main memory and the second memory device then may be considered to be a conventional auxiliary memory. In normal operation, all locations in bulk memory are virtually addressed.

SUMMARY OF THE INVENTION

Therefore, it is a primary object of this invention to provide an improved method and control circuitry for virtual addressing in a digital computer system.

Another object of this invention is to meet the primary object of this invention by providing a method and control circuitry for virtually addressing instruction words and operands in different ways so that their fetching is accomplished differently.

Still another object of this invention is to provide, in a digital computer system using virtual addressing, improved method and control circuitry for replacing pages of instruction words in a task memory.

A still further object of this invention is to provide, in a digital computer system using virtual addressing, improved data protection.

With the foregoing in mind, the method we contemplate may be seen to include a virtual addressing technique comprising generally the steps of: (1) forming a translation index table to define a program to be executed; (a) in response to each successively encountered translation index word during execution, alternatively, (a) fetching an operand from a main memory section of a bulk memory and applying such operand to an arithmetic processor, or (b) determining whether or not a required page of procedure steps is resident in task memory and, if present, addressing such required page and executing or, if not present, fetching such required page from bulk memory and, after entering at a desired address in task memory, executing. Whenever a page of procedure steps is required, the method also contemplates the step of updating the contents of the translation index table to provide a task memory contents index corresponding to the current contents of the task memory as execution of the program proceeds. Our method also includes a replacement technique comprising either designating, in a task memory address field in each translation index word, a task memory address for each fetched page of procedure steps or, in response to an instruction in any procedure step fetched from bulk memory during execution, following a selected one of a plurality of algorithms to determine the task memory address for all pages of procedure steps fetched from bulk memory after such instruction is encountered. Our method also includes an access protection technique whereby, in response to a protection code in a field in each translation index word, access to any location in bulk memory may be restricted, or not, as desired. Our contemplated apparatus includes a control unit, at each processor in a digital computer system, responsive during execution of a program to the current translation index word in the translation index table to transmit, when required, command signals to bulk memory for fetching pages of procedure steps or operands and to direct fetched pages of procedure steps to a particular page in task memory and to direct fetched operands to an arithmetic processor. The contemplated control unit also includes means for designating the particular page in task memory to which fetched pages of procedure are to be directed and means responsive to an access protection code in each current translation index word to determine the way in which access to bulk memory may be effected.

BRIEF DESCRIPTION OF THE DRAWINGS

For a more complete understanding of our concepts, reference is now made to the following description of preferred embodiments of our invention as illustrated in the accompanying drawings, wherein:

FIGS. 2(A) through 2(E) illustrate the format of statements used to effect different steps in our contemplated method and to actuate different parts of our contemplated apparatus;

FIGS. 3(A) through 3(E), taken together constitute a block diagram of our contemplated control unit, showing also the relationship between such unit and other elements of a digital computer system.

DESCRIPTION OF THE PREFERRED EMBODIMENTS

Figure 1:
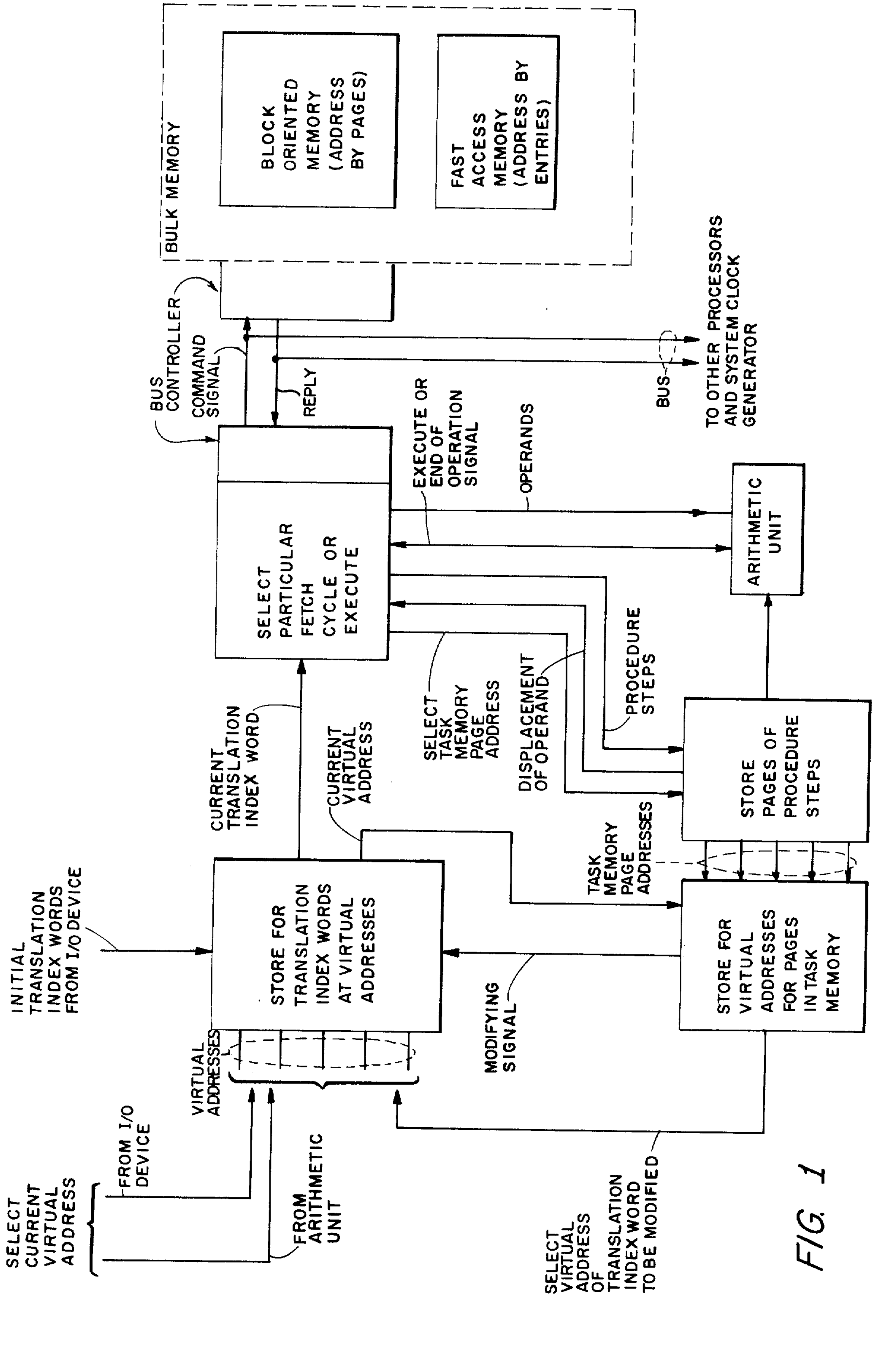
FIG. 1 is a sketch illustrating our contemplated method the sketch being simplified to show a single one of a plurality of processors which may be used.

Before referring to the drawings, it should be noted that the method herein contemplated for virtual addressing a digital computer system is partially based on the concept that the contents of each logical statement, or translation index word, for any program may be changed so that access to bulk memory may be made to depend upon the type of information required. In particular, designated code fields in each translation index word may contain codes which, when sensed during execution of a program, automatically cause access to either: (a) all of the entries on an addressed page in bulk memory; or, (b) a single entry in bulk memory. The flexibility afforded by coding translation index words to permit access either to a complete page of entries in bulk memory or to a single entry in turn allows memory devices having different costs and characteristics to be combined to form bulk memory at an optimum cost without detracting too greatly from system performance. For example, relatively low cost bulk-oriented memory devices with relatively long access times, as magnetic tapes or drums, may be used to store bulk oriented entries (such as instructions, or "procedure steps") and relatively high cost memory devices with relatively short access times, as magnetic core memories, may be used to store individual entries (such as operands). It will be noted that if, as we contemplate, access time to any memory device storing operands in bulk memory is the same as access time to any address in local memory, then operands may be applied directly to the arithmetic unit in any processor, thereby reducing the required capacity of local memory.

Another concept on which our contemplated method is based is that, during execution of a program, the optimum replacement rule for entering newly required pages, or replacing present pages, in task memory may be changed. For example, during execution of a program it may be desirable first to replace pages in task memory by following a "first in - first out" rule, then following a "random selection" rule and finally by a "programmer selected" rule.

With the foregoing in mind our contemplated method will now be described. The first step is to enter translation index words in logical sequence in a translation index table to control execution of any given program. That is, successive virtual addresses are assigned to successive translation index words having formats as shown in FIG. 2(A). It is noted here that the task memory address field of each translation index word may, or may not, be initially filled. (If it is desired that the location of any replacement page in task memory be determined, a priori, following any programmar replacement rule, then the task memory address field would be initially filled.) It is also noted that the present or not present indicator field in all translation index words initially contains a not present code, say a logical zero. The argument thereafter used to reference any translation index word in the translation index table is the virtual address of such word. The location code and the parity code in each translation index word provide the minimum information needed to address bulk memory. It is obvious, however, that the just mentioned information is insufficient for any practical and useful system because, with only such basic information, excessive amounts of time would be consumed in accessing operands in bulk memory. To reduce access time where possible, the page or operand indicator (respectively, say, either a logical one or a logical zero) in each translation index word is used to differentiate between paged information and unpaged information in bulk memory.

When the translation index table is loaded, program execution is initiated by fetching the instruction at the word located at displacement zero in the page in bulk memory designated by the location code in the translation index word at the lowest address in the translation index table and incrementing to the next following translation index word. This process is commonly known as bootstrapping. Upon reading the second, and all following, translation index words the contents of the various fields in each translation index word (if the associated access protection code permits) one of the following modes of operation is caused to occur:

A. Fetch a desired operand from bulk memory;

B. Fetch, after determining that a desired page of procedure steps is not present in task memory, such desired page of procedure steps from bulk memory; or C. Execute a desired procedure step, or steps, if the page containing such step, or steps, is available in task memory for processing.

In any case, if the associated access protection code does not permit operation, then the program is interrupted. It should be noted here that an access protection code may also be provided to allow the number of entries in the translation index table to be rounded out to an integral multiple of the number of entries on a single page in such table. That is, after the last translation index word required for a program is entered in a page in the translation index table, additional translation index words, each having an appropriate access protection code, may be entered in the translation index table until the page is filled.

FETCHING A DESIRED OPERAND

When the page or operand indicator in the current translation word is a logical zero, it is required that an operand be fetched bulk memory. To accomplish such fetching, a command word having the format shown in FIG. 2(B) and marked operand must be formed and transmitted to bulk memory. The higher order code in the current translation index word contains, as shown in FIG. 2(A), the higher order part of the real address of the desired operand in bulk memory. The current task memory procedure step, as shown in FIG. 2(D), contains a displacement code as a part of an operand address. Such displacement code is concatenated with the contents of the real address field in the current translation index word to complete the real address of the desired operand in bulk memory as shown in FIG. 2(B). The command word is completed by a return address code (usually identifying an originating station or processor) and a parity bit. When a command word is formed further operation of the processor is inhibited until a reply, in the format shown in FIG. 2(C) and marked operand, is properly received from the bulk memory. This means that, when a reply is received, the processor is conditioned to receive only an operand and no code field is needed in the command word to distinguish between operands and pages of procedure steps returned from bulk memory. The reply from the bulk memory is applied directly to the arithmetic unit. That is, the bulk memory serves, when operands are fetched, as a conventional main memory.

FETCHING A DESIRED PAGE OF PROCEDURE

When any translation index word is read, a page fetching operation is required if the page or operand indicator is a logical one and the present or not present indicator is a logical zero. That is, a command word having the format shown in FIG. 2(B) is transmitted to the bulk memory with a logical one in the page or operand indicator field of such a command word. The contents of the location code field in such command word are caused to be interpreted as a page address in the bulk memory and all entries on the addressed page in bulk memory to be returned sequentially to the processor. With the number of entries on any page known, a priori, the number of procedure steps from the bulk memory may be continued until their total equals the number of procedure steps on a page in bulk memory. When all displacements on a page in bulk memory do not contain procedure steps then the last may be an end-of-entry instruction to indicate that all procedure steps on a page in bulk memory have been fetched. Operation of the processor is inhibited until all related entries are fetched.

As a page of procedure steps is fetched, it is necessary that each successive procedure step in such page be entered in task memory. Until all available pages in the task memory are occupied, no particular difficulty is encountered. After the task memory is filled, however, consideration must be made of the effect of any replacement on the efficiency of processing later on in the execution of any given program. Obviously, any page of procedure steps to be replaced should be a page which is least likely to be required again during execution. Unfortunately, as noted hereinbefore, the least likely page may change as a program proceeds toward complete execution. Our contemplated method then envisages page replacement in task memory by following either one of two different types of replacement rules: (a) a programmer selected rule; or, (b), a program content rule, or heuristic algorithm.

The programmer selected rule simply is that, when page replacement is required, the address of any new page to be entered in task memory is designated before execution of a program is started. To accomplish this, a designated task memory address is entered in the proper field in each translation index word when the translation index table is being entered. Thus, whenever a page of procedure steps is to be fetched from bulk memory and entered in the task memory, the page address in task memory may be determined by the task memory address in the corresponding translation index word. If there is already a page in task memory at that address, such page will always be overlayed by the newly fetched page from bulk memory. The "present or not present" indicator of the translation index word for the newly fetched page is changed from a not present indication to a present indication and, if a page has been replaced, the present or not present indicator of the translation index word for such replaced page is changed to not present.

The program content rule is simply that an instruction may be contained in any procedure stip to determine how subsequent page replacements in task memory are to be performed. The program content rule, as contrasted with the programmer selected rule, is adaptive to changing conditions encountered during the execution of a program. The program content rule is based on the fact that, the optimum rule for page replacement changes infrequently, an instruction for a given program content rule may ordinarily be used for a relatively long peroid during execution to establish the replacement algorithm which determines where newly fetched pages should be entered in task memory. Thus, when any procedure step indicates that a new page is to be fetched from bulk memory and loaded into task memory, the particular address in task memory at which such new page is to be entered is determined by the last previously specified program content rule. Whenever a page is replaced in task memory, in accordance with any program content rule, the translation index word corresponding to the newly entered page must be modified by adding its task memory address and changing the not present indication in the present or not present indicator field to a present indicator. If the newly entered page actually replaces a page already in task memory, the present indication in the translation index word associated with that page must be changed from a present indicator to a not present indicator.

It will be observed that as execution of a program proceeds, the contents of different translation index words are updated to reflect changes in the contents of task memory. It follows then that, if all translation index words are inspected and those having a present indicator in their present or not present indicator fields are determined, occupied task memory locations may be correlated with either virtual addresses or bulk memory location codes. Once a desired correlation is established then the various translation index words required to be updated may be changed. It is evident, however, that inspection of all translation index words for any program which may be executed is a process which increases in complexity with length of program. We prefer, instead to form a task memory contents index wherein task memory page addresses are the argument and the virtual addresses of those translation index words having present indicators in their present or not present indicator fields are the entries. By reference to such an index, then, the virtual address of the translation index word which contains the task memory page address of any page in task memory to be replaced may be found (without requiring inspection of all translation index words).

APPARATUS

Before referring to the block diagram of apparatus according to our invention, it should be noted that simplifications have been made wherever possible. For example, conventional read and write control circuits have not been shown, nor have the details of the various read only memories been illustrated. Further, even though multi-bit codes are used, single bit signals have been shown wherever possible. It is felt that such simplifications, and others made but not now mentioned, will allow the concepts of this invention to be more clearly understood. With the foregoing in mind the apparatus illustrated in FIGS. 3(A), 3(B), 3(C), 3(D) and 3(E) will now be described.

APPARATUS FOR PROVIDING A TRANSLATION INDEX TABLE

Figures 3, 3A:
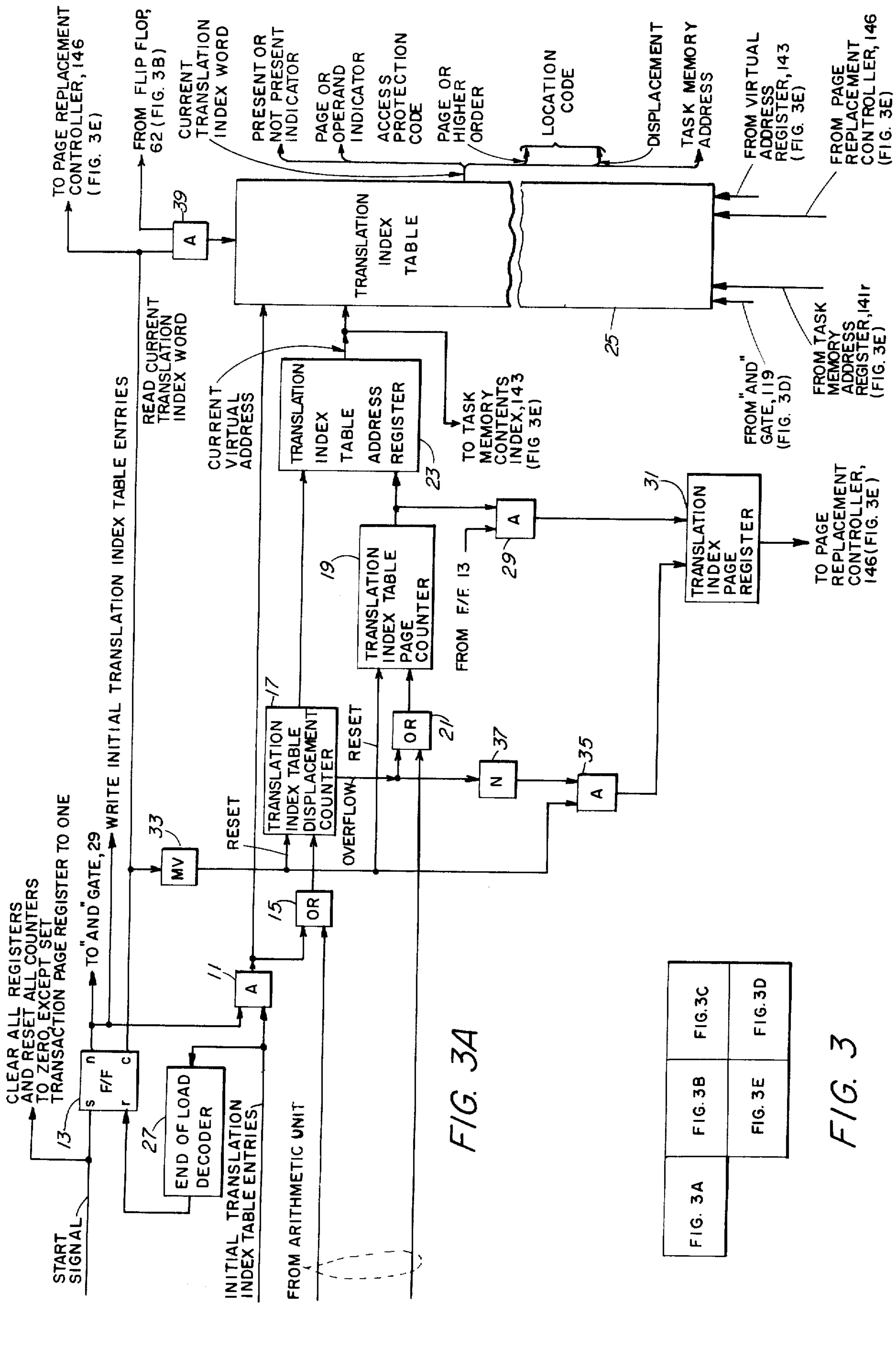
FIG. 3 is a sketch showing how
FIGS. 3(A) through 3(E) are related to each other.

Referring now to FIG. 3(A), initial translation index table entries from any convenient source are impressed on AND gate 11, enabled when a start signal from any convenient source sets a flipflop 13. The initial translation index entries are counted, after passing through an OR gate 15, by a translation index table displacement index table displacement counter 17 having a capacity equal to the number of entries on a page in the bulk memory of the system. Each time the translation index table displacement counter overflows, a translation index table page counter 19 is, via OR gate 21, incremented. The contents of the two translation index table counters (17 and 19) are concatenated in a translation index table address register 23 to select contiguous addresses in a translation index table 25 (here a part of task memory). It may be seen, therefore, that initial translation index table entries are written at contiguous virtual addresses in the translation index table 25 until an end of load code is detected by a conventional end of load decoder 27 to produce a reset signal for the flipflop 13. During the time initial translation table entries are being entered, an AND gate 29 is enabled (by a line marked L from the flipflop 13) so that the contents of the translation index table page counter 19 are transferred to a translation index page register 31. The contents of the latter then indicate the number of full pages in task memory occupied by the translation index table 25.

When flipflop 13 is reset, a monostable multivibrator designated M.V. 33 is acutated to reset (after a time delay not shown) both the translation index table dispalcement counter and the translation index table page counter 19. During such time delay an AND gate 35 is enabled to pass the output of an inverter 37 (if a logical one) to increment the translation index page register 31. The inverter 37 in turn is connected to the overflow line of the translation index table displacement counter 17. A logical one is, therefore, passed through AND gate 35 whenever the contents of the translation index table displacement counter 17 indicate that the last page in the translation index table is not filled. The contents of the translation index page register 31 are then indicative of the number of full pages, plus one (if the last ones of the initial translation index table entries occupy a part of a page). If, as would ordinarily be the case, the translation index table and the task memory are to occupy different pages in a common local memory, the contents of the translation index page register 31 at the end of the just described operations designate the highest page address for the translation index table. The lowest address for pages of procedure steps then may be designated by adding one to the contents of the translation index page register 31. Alternatively, the same result may be attained by not clearing the translation index table page counter 19 when a start signal is received but rather by then setting that counter to a count of one. On completion of the loading cycle just described hereinbefore, the contents of the translation index page register 31 will then be the lowest page address for any fetched pages of procedure steps in local memory.

The format of each initial translation index table entry referred to hereinafter as a translation index word is, as noted hereinbefore, shown in FIG. 2(A). At the end of the just described load cycle: (a) the location code field in each translation index word contains a page address in bulk memory (if a page indicator is present) or a portion of an address in bulk memory (if an operand indicator is present); (b) the page or operand indicator field contains a logical one or a logical zero representing, respectively, that a page of procedure steps in bulk memory or an operand (or operands) in such memory is required; (c) the access protection code field contains an appropriate code to permit, or inhibit, access to bulk memory; (d) the task memory address field contains the address in task memory in which a page of procedure steps from bulk memory is to be transferred (if programmer control is opted for a replacement rule) or all logical zeros (if program content rule is opted for a replacement rule; (e) the present or not present indicator field contains a logical zero; and the parity field contains a desired parity code.

It will be observed that, at the end of the loading cycle, the resetting of the translation index table displacement counter 17 and the translation index table page counter 19 causes the translation index table address register 23 to address the first translation index word. At the same time a read signal is applied. In other words, the reset signal at the end of the load cycle causes an unconditional command to read the first translation index word to be produced.

APPARATUS FOR CONTROLLING OPERATION

Each successively read translation index word may, when read, be considered the current translation index word. Thus, when any such word is read, the page or operand indicator and the present or not present indicator in that word are applied, either directly or through inverters 42, 44, as shown, to AND gates 46, 48, 50, 52 (FIG. 3 (B)). With these AND gates acutated as shown, each translation index word causes a single one to produce a logical one as follows: (a) AND gate 46 produces a logical one if both the page or operand indicator and the present or not present indicator are logical zeros (meaning an operand is required to be fetched from bulk memory); (b) AND gate 48 produces a logical one if the present or not present indicator is a logical one and the page or operand indicator is a logical zero (meaning an impossible condition where a single entry fetched from bulk memory is resident in task memory); (c) AND gate 50 produces a logical one when both the page or operand indicator and the present or not present indicators are logical ones (meaning aa required page is resident in task memory and execution of procedure steps may commence); and (d) AND gate 52 produces a logical one when the page or operand indicator is a logical one and the present or not present indicator is a logical zero (meaning that a required page is not resident is task memory and a page fetching cycle is to be initiated).

When a fetch operand cycle is to be initiated, a logical one out of AND gate 46 enables an AND gate 54 to allow the location of a desired operand in bulk memory to be passed to the control circuitry to be described in connection with FIG. 3(C). Such location is derived by combining the codes in the base address field of the current translation index word and the concatenated (in an adder 56) codes derived from the displacement field in the instruction. It is noted that, when the first translation index word is read, there is no "current" page in task memory. This means that: (a) only operands with zero displacement in any page in bulk memory then may be addressed; or (b) the first translation index word should not call for a fetch operand cycle but rather should call for a fetch page cycle (to be described). A ligical one out of AND gate 46 also sets a normally reset flipflop 58. The normal output of the latter then constitutes a fetch operand command signal and the complementary output constitutes an inhibit operation signal. The flipflop 58 is reset, as indicated, when an end of fetch operand cycle signal is received.

When a fetch page cycle is initiated, a logical one out of AND gate 52 enables an AND gate 60 to pass the page location in bulk memory of a page designated by the contents of the page location field in the current translation index word. A logical one out of AND gate 52 also sets a normal reset flipflop 62. The latter then produces a fetch page command signal from its normal output and an inhibit operation signal from its complementary output. The flipflop 62 remains in its set condition until reset by an end of page fetch command signal.

Figure 3B:
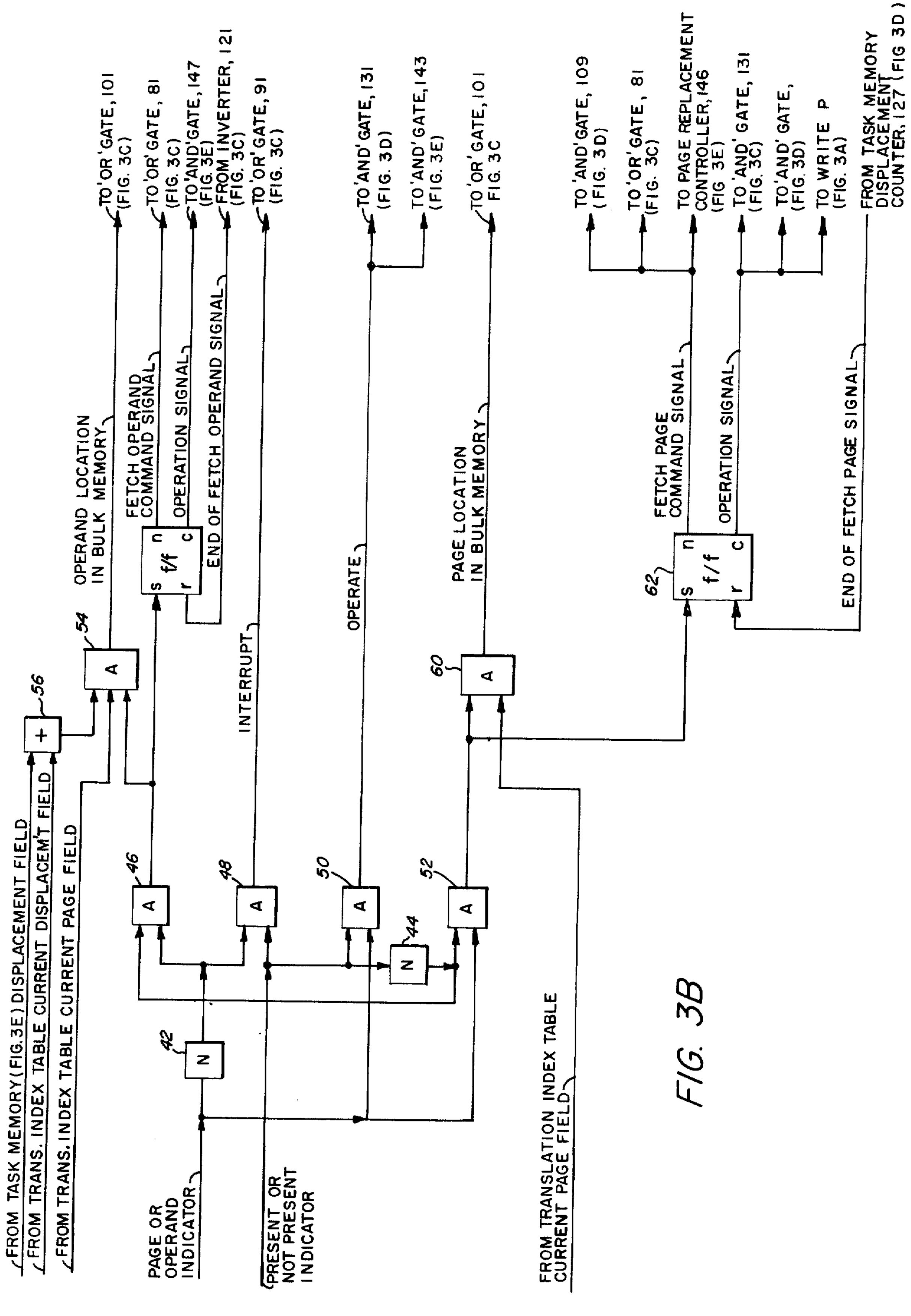
Figure 3C:
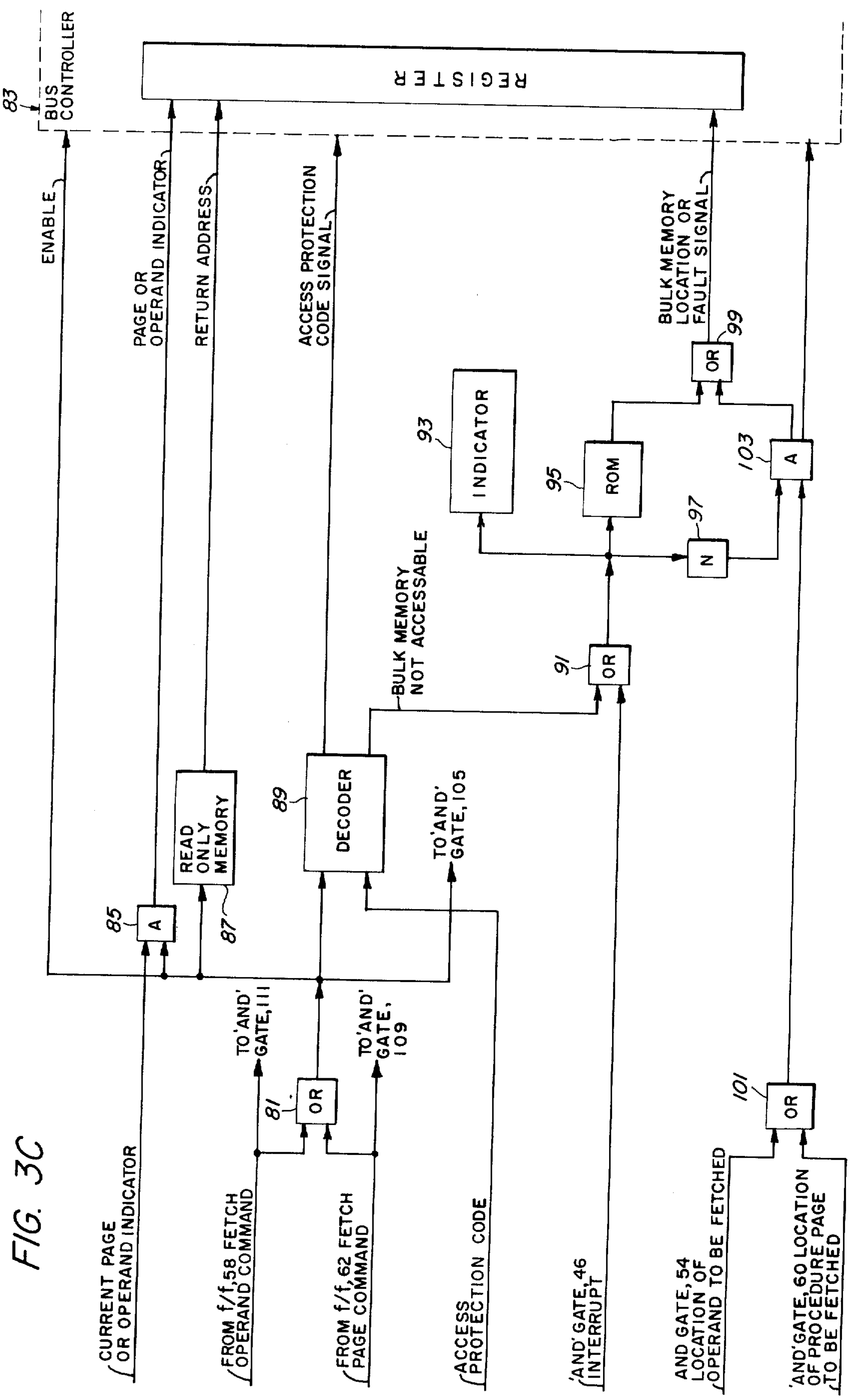

Referring now to FIG. 3(C), it may be seen that the normal outputs of flipflops 58, 62 are passed through an OR gate 81, thereby producing a logical one whenever either a page of procedure steps or an operand is to be fetched from bulk memory. Such a logical one remains present at the output of OR gate 81 as long as either flipflop 58, 62 is set, i.e., until fetching is completed to enable a bus controller 83. The latter preferably is a bus controller of the type shown and described in the copending U.S. Pat. application entitled "Bus Controller for Digital Computer System," filed Oct. 26, 1973 in the name of Alan J. Deerfield et al and assigned to the same assignee as this application. The logical one applied to the bus controller 83 from OR gate 81 is the equivalent of a want signal in the referenced patent application. The output of the OR gate 81 is also applied to an AND gate 85, a read only memory 87 and a decoder 89. The current page or operand indicator in the current translation index word is also applied to AND gate 85, thereby correspondingly loading a portion of a register (not numbered) in the bus controller 83. The read only memory 87 produces a return address, thereby loading a second portion of the register in the bus controller 83. The decoder 89, when actuated by a logical one out of OR gate 81, allows the access protection code in the current translation index word to produce an appropriate access protection code signal (which is the equivalent of the permit signal in the referenced patent application). It will be recognized that, if the access protection code signal out of decoder 89 indicates that the location in bulk memory designated by the current translation index word cannot be accessed or if the output of AND gate 48 (FIG. 3B) indicates an impossible condition, the existence of either state should be detected. Thus, the outputs of AND gate 48 and of decoder 89 are passed through an OR gate 91 to an indicator 93 (as a lamp), a read only memory 95 and an inverter 97. The output of the read only memory 95 is a coded signal which may be passed through an OR gate 99 to be loaded into the register in the bus controller 83 in lieu of a location code in bulk memory and transmitted as desired to actuate any desired fault correction means (not shown). When bulk memory is accessible, the location code from AND gate 54 or AND gate 60 (FIG. 3(B)) is passed through OR gate 101, AND gate 103 and OR gate 99 to load a portion of the register in the bus controller 83 with a location code. It is noted here, that although not shown, a parity code could, in practice, be loaded into an appropriate field in the register in the bus controller by making OR gates 99, 101 and AND gate 103 wide enough to accommodate any desired parity code, in addition to a location code. It may be seen, therefore, that a command word having a format as that shown in FIG. 2(B) is loaded into the register in the bus controller 83.

When the bus controller 83 seizes a bus, as described in the reference patent application, the command word in the register in the bus controller 83 is transmitted over the seized bus to bulk memory when the location code in such command word indicates a location in bulk memory. The receiving portion, shown in the referenced patent application, of the proper device in bulk memory then is responsive to such a command word to check parity, to access the proper location in bulk memory and to retransmit an operand, or a page of procedure steps, in the format shown in FIG. 2(C). In this connection it is noted that the page of operand indicator in each command signal properly received at bulk memory determines whether an operand or a page of procedure steps is to be returned. That is, a logical one, as the page or operand indicator, is effective, again as described in the referenced patent application, to cause a bus to be seized for the time required to return, in response to a single command signal, all entries on a page in bulk memory before the bus is released.

Figure 3D:
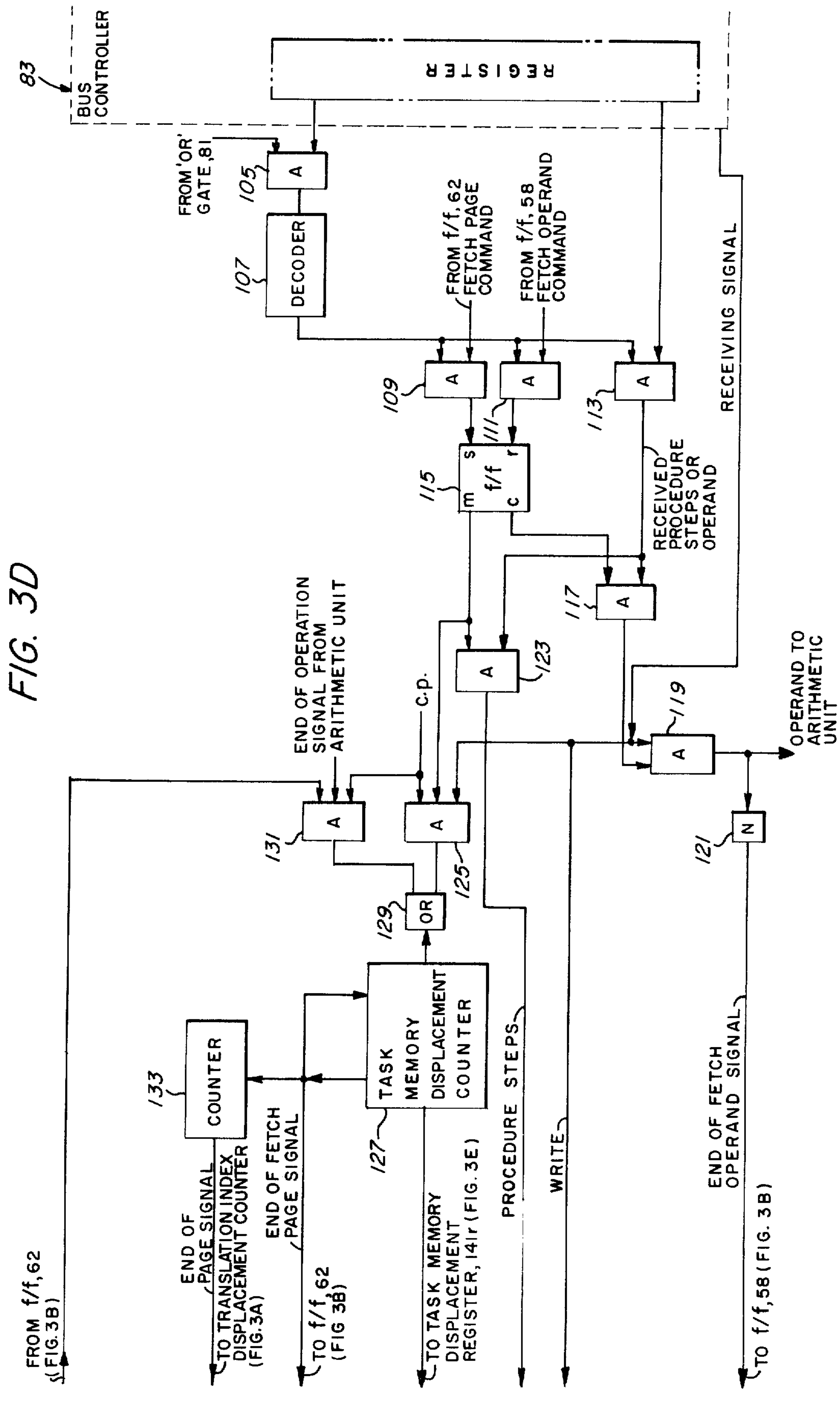

The output of OR gate 81 is connected to an AND gate 105 (FIG. 3(D)) to allow the return address portion of each word back from bulk memory to pass to a decoder 107. If a page of procedure steps in being received, flipflop 62 (FIG. 3(B)) is set to enable AND gate 109 to set a flipflop 115. If an operand is being received, flopflop 58 (FIG. 3(B)) is set to enable AND gate 111 to reset flipflop 115. When reset, flipflop 115 partially enables AND gate 117 7o pass received operands through AND gate 119 to the arithmetic unit. When AND gate 119 is inhibited by reason of the receiving signal from the bus controller 83 changing to a logical zero, an inverter 121 is caused to produce an end of fetch operand signal to reset flipflop 58 (FIG. 3(B)).

Figure 3E:
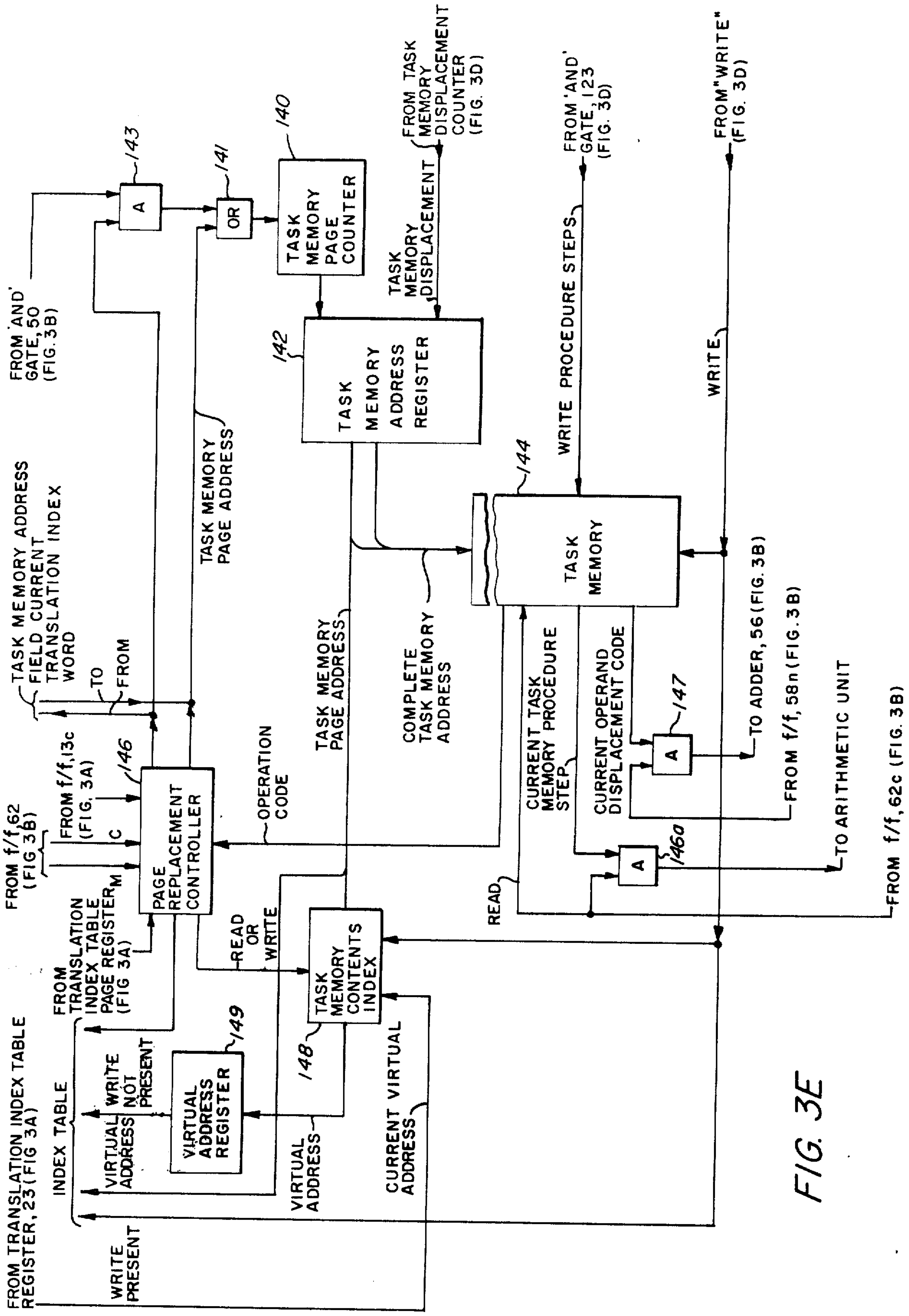

When flipflop 115 is set, AND gate 123, 125 are partially enabled to allow each procedure step received (while a receiving signal is produced by the bus controller) to be written in task memory 144 (FIG. 3(E)) and a task memory displacement counter 127 to be actuated to select contiguous addresses within a page in task memory 144 by reason of clock pulses passing through AND gate 125 and OR gate 129. When the task memory displacement counter 127 is filled, an end of fetch page signal is transmitted to flipflop 62 (FIG. 3(B)) to reset that flipflop. It is here noted that, when an end of fetch page signal occurs, AND gate 50 (FIG. 3(B)) is conditioned to partially enable AND gate 131, thereby permitting clock pulses to be passed to the task memory displacement counter 127 each time an end of operation signal is received from the arithmetic unit. In other words, the task memory displacement counter 127 then operates in the same way as a conventional program counter. When the task memory displacement counter 127 overflows for the second time, a counter 133 is caused to produce an output signal to increment the translation index table displacement counter 17 (FIG. 3(A)), thereby incrementing the address selected in the translation index table. In this connection it is here noted that, at any time during the operation of the arithmetic unit, that element may also cause the contents of the translation index table displacement counter 17 and the translation index table page counter 19 (FIG. 3(A) to be changed. In either case, however, the newly addressed translation index word is inspected as described above to determine whether an operand is to be fetched or whether or not a new page of procedure steps must be fetched.

To complete the address of a page of procedure steps in task memory 144, it is necessary to concatenate the outputs of the task memory displacement counter 127 and a task memory page counter 140. When this is done, the contents of a task memory register 142 become the required address in a task memory 144. The task memory page counter 140 is set to correspond with a particular count by a page replacement controller 146 (to be described hereinafter) passed through an OR gate 141. The second input to the just mentioned OR gate 141 is derived from an AND gate 143 which in turn passes the task memory address in the current translation index word when such word contains a present indication. Such a condition exists when AND 50 (FIG. 3(B)) passes a logical one AND gate 146*a* is enabled to pass the contents of the current address in task memory 144 when flipflop 62 (FIG. 3(B)) is reset at the end of any fetch page cycle and AND gate 147 is enabled when flipflop 58 (FIG. 3(B)) is set at the beginning of any fetch operand cycle. The latter gate then allows the contents of the displacement field in the current task memory word to be entered into adder 56 (FIG. 3(B)) to be available for forming an operand location in bulk memory, if required.

ENTERING A PAGE OF PROCEDURE STEPS IN TASK MEMORY FOLLOWING A PROGRAM

When a fetch page cycle is initiated, i.e., when flipflop 62 (FIG. 3(B)) is set, the page address in task memory for the page of procedure steps to be fetched from bulk memory is selected and the contents of task memory are inspected to determine whether or not a previously fetched page of procedure steps occupy the selected page in task memory. This is, the contents of a task memory contents index sotre are inspected in a manner to be described. To select a page address in task memory, a page replacement controller 146 is actuated to set a task memory page counter 140 through an OR gate 141. The details of one embodiment of the page replacement controller 140 will be described in connection with FIG. 4. Suffice it to say here that such controller operates when a page of procedure steps is to be fetched, to produce a task memory address following either a programmer replacement rule or a program content replacement rule. If inspection of the contents of the task memory shows that the selected page to be used for the page of procedure steps to be fetched is occupied, then the virtual address of the occupying (or resident) page is determined and the present indicator in the translation index word at such virtual address is changed to a not present indicator. Finally, when the fetch page cycle is completed, i.e., when flipflop 62 (FIG. 3(B)) is reset, the not present indicator in the current translation index word is changed to a present indicator and the task memory page address is entered in the proper field in that word.

The contents of the task memory page counter 140 are transferred to a task memory address register 142, thereby addressing a task memory contents index 148. The latter is any convenient memory, as, for example, a core memory, adapted to store a word in the format shown in FIG. 2(E) at each different address therein. The number of entries into such memory equals the maximum number of pages in task memory. When the page replacement controller 146 completes its cycle of operation, the contents of the task memory contents index 148 at the address selected by the task memory address register 142 are read. In other words, any virtual address previously entered at such address in the task memory contents index 148 is read and entered in a virtual address register 149. The contents of the latter then designate the virtual address of the translation index word whose present indicator must be changed to a not present indicator over a write not present line (not numbered).

When the fetch page of procedure steps previously described is completed the write line from FIG. 3(D) is, after a short time delay (not shown), connected to the task memory contents index 148 and to the present or not present indicator field in the current translation index word. The results are that the addressed contents of the task memory contents index 148 are overlayed with the current virtual address and a present indicator is entered in the current translation index word.

EXECUTION OF PROCEDURE STEPS

After a page of procedure steps has been entered in task memory, flipflop 62 (FIG. 3(B)) is reset and AND gate 50 (FIG. 3(B)) is conditioned to produce a logical one. AND GATE 131 (FIG. 3(D)) then is conditioned to allow the task memory displacement counter 127 (FIG. 3(D)) to operate as a program counter for the task memory and an AND gate 146 (FIG. 3(E)) is enabled to pass each current procedure step from task memory to the arithmetic unit. The latter then is responsive to each procedure step in a conventional way. The operation code in each procedure step (or a portion of such code) is passed to the page replacement controller 146 to provide, if a program replacement rule is opted, a control signal for that controller. An operand displacement code in each procedure step is applied to an AND gate 147. The just-mentioned gate is enabled, as indicated, when an operand is to be fetched to provide an input to the adder 56 (FIG. 3(B)). It may be seen, therefore, that successive procedure steps are passed to the arithmetic unit until either: (a) the last procedure step on a page in task memory has been passed to the arithmetic unit; or (b) a procedure step encountered before all procedure steps on a page have been read requires that a different page be referenced.

Figure 4:
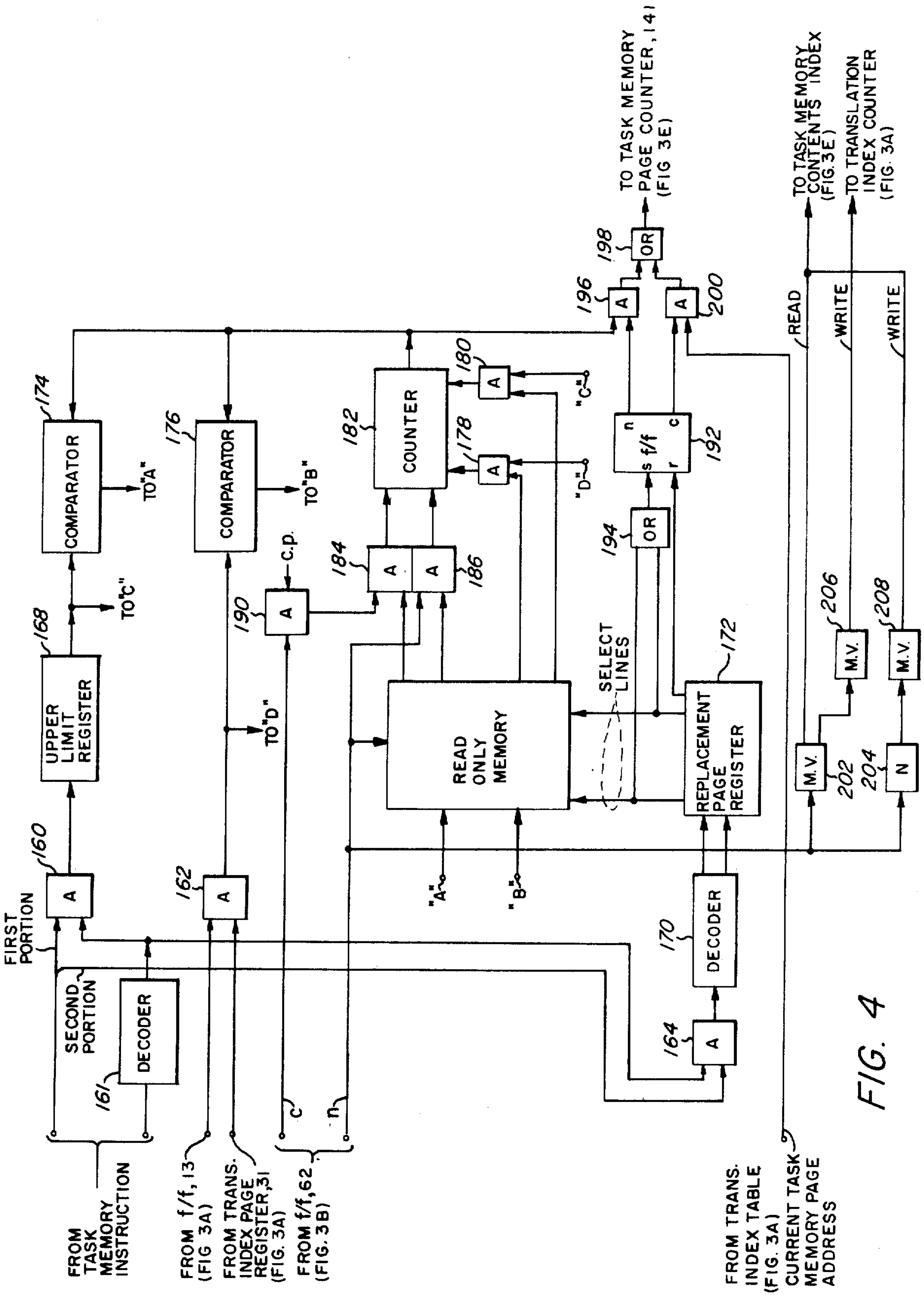
FIG. 4 is a block diagram of an exemplary page replacement controller adapted to control replacement of pages in task memory according to any desired one of a plurality of replacement rules.

Referring now to FIG. 4, details of an exemplary page replacement controller according to our invention will be described, illustrating implementations for different algorithms to select a page address in task memory for fetched pages. The page replacement rules illustrated in particular are: (a) select address randomly; (b) first infirst out (FiFo); and (c) select address designated before program is executed (programmer selected rule).

Two conditions must be met before the exemplary page replacement controller may operate: (1) loading of the translation index table must have been completed; and (2) a special procedure step in task memory must have been read. The first condition must be met in order that the lowest page address available for entry of fetched pages in local memory may be determined. The second condition must be met in order that the highest page address available for entry of fetched pages in local memory may be determined and in order that a desired page replacement rule may be selected.

It will be remembered that the end of the loading cycle of the translation index table is indicated by the resetting of flipflop 13 (FIG. 3A) and that the final contents of the translation index page register 31 (FIG. 3A) are indicative of the lowest page address in task memory available for any fetched page. The complementary output of the flipflop 13 and the contents of the translation index page register 31 are, therefore, impressed on an AND gate 162 to produce a lower limit signal at the output of such gate.

The code in a first portion of the special instruction is a code indicating the highest page address available in task memory for entry of a page of procedure steps. The first portion is impressed on an AND gate 160 along with a signal indicative of the reading of any special instruction produced by a decoder 161. After passing through AND gate 160, such first portion then is passed to a storage register (here designated the upper limit register 168). It is noted here that the difference between the contents of upper limit register 168 and the output of AND gate 162 (which is the contents of the translation index page register 31 (FIG. 3(A)) is the number of pages available in task memory for pages of procedure fetched from bulk memory.

The second portion of the special instruction is a code indicating the particular page replacement rule desired to be followed. Such second portion, after passing through AND gate 164, is applied to a decoder 170 which, in turn, produces a logical one to load one stage of a storage register, here called the replacement rule register 172. The stage so loaded in the just-mentioned register then designates a particular page replacement rule to be followed. For example, in the illustrated case, a logical one in the $0^{th}$ stage means select address randomly; a logical one in the $1^{st}$ stage means "FiFo", and a logical one in the $2^{nd}$ stage means programmer selected rule.

The contents of upper limit register 168 and the output of AND 162 are applied, respectively, to comparators 174, 176. These just mentioned comparators, for reasons to be made clear, produce limit signals to define the pages in task memory available for pages fetched from bulk memory. The outputs of the comparators 174, 176 are applied to a read only memory 182 along with a fetch page command from flipflop 62 (FIG. 3(B)) and a number of select lines (not numbered) from each stage (except that stage designating programmer selected rule) of the replacement rule register 172. It will be recognized now that the read only memory 182 may, in response to the logical level at any time on the input lines to such memory, be arranged to produce: (a) a pair of count limiting signals; and (b) a page replacement rule selection signal. The count limiting signals are applied to AND gates 178, 180 to enable the output of AND gate 162 and the output of the upper limit register 168 to be passed to counter 182 which has a capacity equal to the total number of pages in local memory. The outputs of AND gates 178, 180, however, prevent the counter 182 from counting pages occupied by the translation index table (FIG. 3(A) or pages having an address higher than the address determined by the upper limit register 168. To accomplish this counter 182 is connected to the comparators 174, 176 to produce a logical one out of either when a limit is reached. Thus, the output of counter 182 is constrained at all times to be within an upper and a lower limit.

In the illustrated example, read only memory 182 is caused to actuate one of the lines connected to AND gates 184, 186, 188 when a program content page replacement rule is to be followed. If AND gate 184 is actuated, the page address for a page to be replaced in task memory is selected randomly as follows. The second input to AND gate 184 is derived from an AND gate 190. The inputs to the latter, in turn, are system clock pulses (c.p.) and the complementary output of flipflop 62 (FIG. 3(B)). It follows then that system clock pulses are, whenever pages are not being fetched from bulk memory, applied (through AND gates 190, 184) to counter 182 thereby causing the count therein to change continuously. When a fetch page cycle is initiated AND gate 190 is inhibited, thereby preventing system clock pulses from being applied to counter 182. Because the interval between successive fetch page cycles is unpredicatable, the result is that the count in counter 182 is random when any fetch page cycle is initiated.

When AND gate 186 is enabled each successive fetch page command increments counter 182. When the upper limit (by reason of the limit set by the upper limit register 168) is reached, the count in the counter 182 returns to the lowest count permitted by the limit set by the translation index page register 31 (FIG. 3(A)). It follows, then, that counter 182 at any times has a count which follows a first in-first out rule.

When any program content page replacement rule is to be followed, a flipflop 192 is set through an OR gate 194. This axtion, in turn, enables the then existing count in counter 182 to be passed, through an AND gate 196 and an OR gate 198, to the task memory page counter 141 as described in connection with FIG. 3(E). When a programmer selected page replacement rule is to be followed, flipflop 192 is reset, thereby allowing the selected task memory page address to be passed through an AND gate 200 and the OR gate 198.

As pointed out hereinbefore, it is necessary to provide read and write signals to update the various indices when a page is fetched from bulk memory. To accomplish the required reading and writing in proper sequence, each fetch page common is applied to a multivibrator 202 and an inverter 204. The former immediately produces a read signal for the task memory contents index 143 (FIG. 3(E)) and triggers a following write signal (through operation of a multivibrator 206) for the translation index table (FIG. 3(A)). The inverter 204, on completion of each fetch page cycle, actuates a multivibrator 208 to produce a write signal for the task memory contents index 143 (FIG 3(E)).

Having now described an embodiment of our contemplated method and apparatus, it will now be apparent to one of skill in the art that many changes may be made without departing from our inventive concepts. Probably most importantly, it will be evident that it is not absolutely necessary that all operands be addressed individually in bulk memory. For example, constants or matrices are types of operands which may be addressed by page and treated in the same way as described for pages of procedure steps. Further, it will be apparent that changes may be made in the illustrated apparatus to allow page replacement rules other than those implemented by the illustrated page replacement controller. Still further, it is evident that simplification of the page controller may be easily effected if the upper limit for page addresses in task memory is fixed. Finally, it will be evident that pages of procedure steps or operands fetched from bulk memory need not be directed as shown to the task memory or arithmetic unit in the requesting processor. In view of such obvious modifications that may be made without departing from our inventive concepts, it is felt that our invention should not be restricted to its illustrated embodiments, but rather should be limited only by the spirit and scope of the appended claims.

What is claimed is:

1. In a digital computer system including memory devices forming a bulk memory and a local memory, wherein locations in any one of a plurality of memory devices making up a said bulk memory may be virtually addressed to provide, on demand during execution of any selected one of a plurality of programs, instructions and operands from different ones of such memory devices for application to, respectively, said local memory and an arithmetic unit included within a processor, the improvement comprising:

a. means for storing a set of logical statements as contiguous translation index words on an integral number of pages in one portion of the local memory, each one of such logical statements containing, at least:

i. a bulk memory location code field;

ii. a local memory page address field;

iii. a page or operand code field; and iv. a present or not present code field;

b. means, respsonsive to the contents of the code and address fields in each one of the logical statements as such statements are read, for addressing the bulk memory with, alternatively:

i. a fetch operand command word containing, at least, a bulk memory address defining the location of an operand to be fetched from bulk memory; or ii. a fetch page of instructions command word containing, at least, a bulk memory page address defining the location of a page of instructions to be fetched from bulk memory;

c. means, responsive to each fetch operand command word, for:

i. receiving the operand commanded to be fetched from bulk memory; and ii. enabling the arithmetic unit to process the fetched operand;

d. means, responsive to each fetch page of instructions command word, for i. receiving the page of instruction commands to be fetched from bulk memory;

ii. means, further responsive to each fetch page of instructions command word, for overlaying such page of instructions on a selected page in local memory;

iii. means, further responsive to each fetch page of instructions command word, for entering a present code in the p"present or not present" code field of the current logical statement; and iv. means, further responsive to each fetch page of instructions command word, for enabling the arithmetic unit to be operated in accordance with successive ones of the fetched instructions.

2. The improvement as claimed in claim 1 wherein the overlaying means includes:

a. decoder means, responsive to different selected ones of selected instructions in the local memory encountered during execution of a program, for producing an enabling signal on different ones of a plurality of lines;

b. a like plurality of latching means, each one thereof being actuated by an enabling signal on a different one of the plurality of lines; and c. a like plurality of address selectors, each one thereof being enabled by a different one of the plurality of latching means, responsive to the number of fetch page of instructions command words generated by reading logical statements when the corresponding one of the plurality of latching means is actuated to produce a page address in local memory for each page of instructions fetched from bulk memory.

3. The improvement as in claim 1 wherein each one of the logical statements includes additionally, an access control field for an access control code to enable or inhibit access to bulk memory, such improvement comprising, additionally, decoding means, responsive to the access control code in each logical statement read during execution of a program, for enabling or, alternatively, inhibiting transmission of a commond word to bulk memory.

* * * * *